United States Patent [19]

Parkinson

[11] Patent Number: 5,455,731
[45] Date of Patent: Oct. 3, 1995

[54] POWER CONTROLLER RESET DURING LOAD STARTING

[75] Inventor: Gerald W. Parkinson, Shelton, Conn.

[73] Assignee: United Technologies Corporation, Hartford, Conn.

[21] Appl. No.: 331,278

[22] Filed: Oct. 28, 1994

Related U.S. Application Data

[63] Continuation of Ser. No. 894,897, Jun. 8, 1992, abandoned.

[51] Int. Cl.⁶ .................................................... H02H 3/00
[52] U.S. Cl. .............................. 361/71; 361/28; 361/94
[58] Field of Search .................................. 361/94, 95, 71, 361/72, 73, 74, 75, 28, 29, 86, 87

[56] References Cited

U.S. PATENT DOCUMENTS 4,241,372  12/1980  Sears ................................ 361/72
4,709,160  11/1987  Kinoshita ........................... 307/253
4,740,883   4/1988  McCollum .......................... 364/140
4,955,069   9/1990  Ionescu ............................. 388/811

Primary Examiner—Todd DeBoer
Assistant Examiner—Sally C. Medley
Attorney, Agent, or Firm—Michael Grillo

[57] ABSTRACT

A solid state power controller is automatically reset if an overload trip occurs during a start-up delay period. If an overload trip occurs during load starting, the SSPC remains tripped for a reset delay period, and thereafter the SSPC is automatically reset, thereby allowing the starting process to continue by heating a lamp filament, accelerating a motor, etc., without indicating a system fault to an operator. At the expiration of the start-up delay period, the SSPC no longer automatically resets in response to an overload condition.

15 Claims, 2 Drawing Sheets

POWER CONTROLLER RESET DURING LOAD STARTING

This is a continuation of copending application Ser. No. 07/894,897 filed on Jun. 8, 1992, now abandoned.

TECHNICAL FIELD

The present invention relates to power control circuits, and more particularly to solid-state power controllers for AC or DC service having automatic reset during load starting to prevent undesirable interruptions in electrical service to loads which draw a high starting current.

BACKGROUND OF THE INVENTION

Circuit breakers of the electromagnetic or thermal type are well-known. Such circuit breakers have trip times in the range of 10 milliseconds to more than one minute, depending on the degree of overload. These trip times may be dangerously too long in many critical circuit breaker applications, such as military, flammable or explosive environments. Furthermore, in large electrical systems, a tripped circuit breaker must be located and subsequently reset manually in order to restore power to the circuit after the fault has been cleared. Other problems associated with such circuit breakers include difficulties associated with reliability, short life, and testing.

The drawbacks associated with electromagnetic and thermal circuit breakers have led to the development of solid-state power controllers (SSPC). SSPC's provide electronic control of the time-to-trip characteristic, e.g., the period from detection of a high load current fault condition to the interruption of power to a load, as opposed to the thermal/mechanical control provided by traditional circuit breakers. This electronic control permits the SSPC to operate much faster for any given overload current, and allows remote operation, e.g., on/off and reset control, of the SSPC. The increased trip speed means that less electrical energy is delivered into an electrical short circuit or overload, thus decreasing the hazard of smoke or flame, and reducing the damage to equipment and electrical wiring. In addition to increased trip speed, the chief advantages of solid-state power controllers over conventional circuit breakers are their improved reliability and life, the ability to control them remotely as a relay substitute, and their built-in test capabilities.

Solid-state power controllers have been developed for numerous applications. U.S. Pat. No. 4,709,160 to Kinoshita discloses a solid-state power controller for DC service. The controller provides a solid-state electrical switch for use in aircraft applications, and is capable of detecting overload conditions, such as those caused by battle damage. It instantly interrupts electrical service to the load, thereby preventing or limiting further damage to the service or load or lead wires. The power controller may be remotely reset after the battle damage or overload condition has been cleared. U.S. Pat. No. 4,955,069 to Ionescu discloses an AC power controller. U.S. Pat. No. 4,740,883 to McCollum discloses a universal solid-state power controller for both AC and DC service.

While shorter trip times are a potential advantage of solid-state power controllers, they can lead to difficulties in the form of nuisance tripping, e.g., undesired turn off of power, when used with certain types of electrical load equipment that draw high starting currents as part of their normal operation. For example, when a lamp is initially energized, the inrush of current may exceed ten times the normal running or operating current. Additionally, for certain motors, the starting surge or current draw may be three to fives times greater than the running current of the motor, and the increased current may last for a second or more. One method for circumventing the high starting current problem is to provide SSPC's with trip times tailored to a particular load's starting current, which would thereby force the manufacturer of equipment having different starting currents to keep a large inventory of SSPC's in stock. In most cases, designers which use SSPC's have chosen to retain the slow trip times of thermal circuit breakers to avoid nuisance trips during load starting, thereby forfeiting the potential advantage of improved smoke and fire protection.

DISCLOSURE OF INVENTION

Objects of the present invention include provision of a solid-state power controller having automatic reset in response to a high current condition caused by the starting of a load which draws a high starting current, and which provides a short trip time in response to a high current condition during normal operation of a load, to thereby provide enhanced overload protection.

According to the invention, a start-up delay period is calculated as the time since power was applied or reapplied to a load by an SSPC, and the occurrence of a high current condition during the start-up delay period causes the SSPC to trip and then automatically reset after a reset delay period.

In further accord with the present invention, after the expiration of the start-up delay period, the occurrence of a high current condition causes the SSPC to trip, and the SSPC does not automatically reset.

The present invention controls an SSPC to respond to a trip in the system by immediately issuing a command to reset, if power has just been applied or reapplied to a load. This allows the starting process to continue by heating a lamp filament, accelerating a motor, etc., virtually without interruption, and without indicating a system fault to an operator. Multiple resets are used if necessary for unusually long starting transients. Once the time for a normal starting transient has expired, fast reset commands are no longer issued, and any overload results in a fast trip of the SSPC. The improved fire protection of the fast trip is still available for essentially all of the operating time of the load.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

The SSPC control of the present invention is particularly well suited for providing automatic reset of an SSPC during starting of an electrical load which draws a high starting current, and which provides fast trip of the SSPC upon the occurrence of a high current condition during normal operation of the load.

Figure 1:
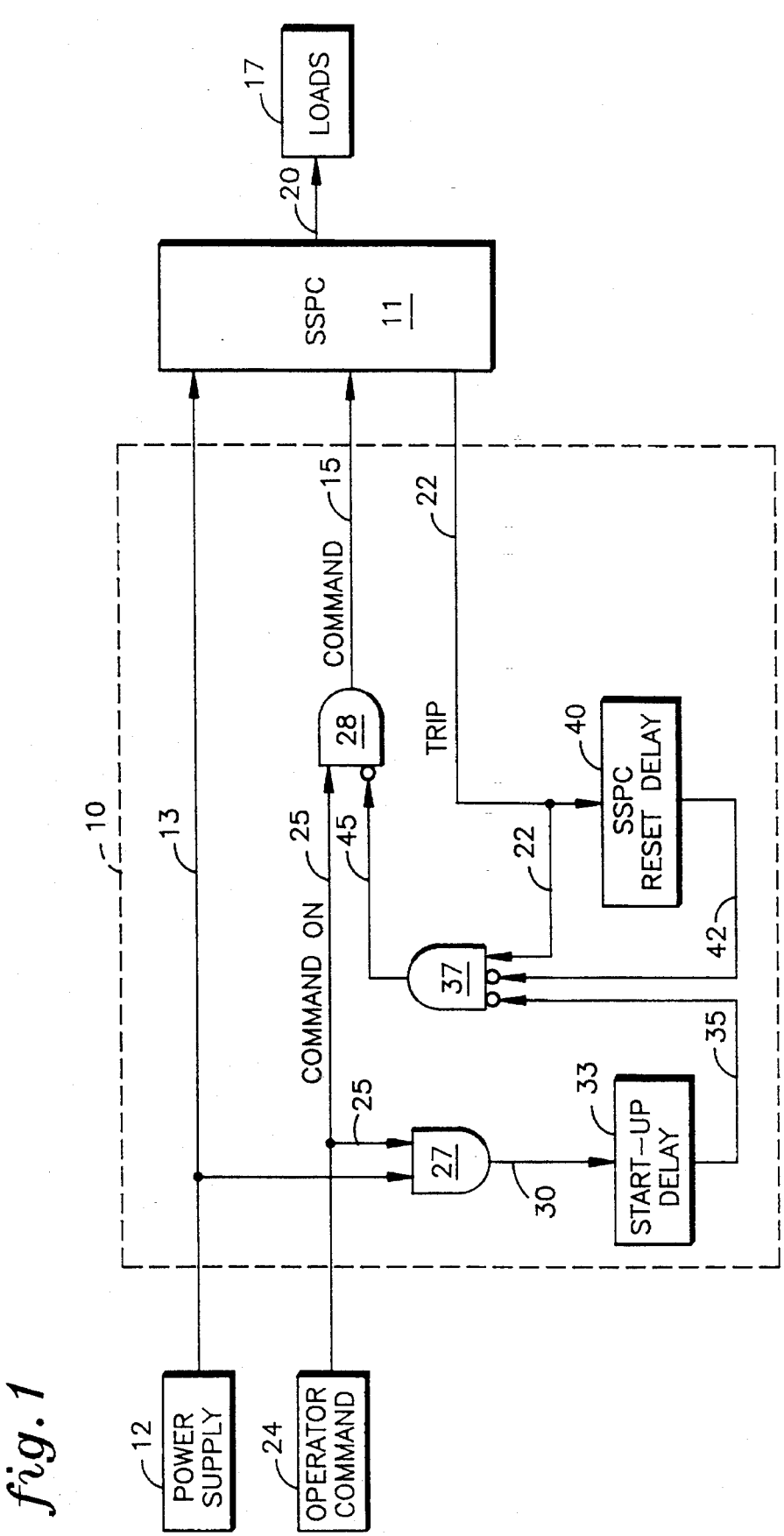
FIG. 1 is a simplified schematic diagram of an SSPC control for providing automatic reset during load starting.

Referring to FIG. 1, the SSPC control (control logic) is everything shown within dotted line 10, for controlling the operation of SSPC 11. A power supply 12, which may be for example, an AC or DC current supply, supplies current on a line 13 to the SSPC 11. If a "COMMAND" signal is present on a line 15, and the SSPC is not tripped, the SSPC 11 provides the input current to loads 17 on supply lines 20. The current supplied to the loads on the line 20 is known as a "load current". The SSPC 11 may be of any suitable type known in the art having a solid-state switch which trips, i.e., opens, in response to the current on line 20 exceeding a threshold magnitude. Once the SSPC is tripped, a TRIP signal is provided by the SSPC on a line 22. The SSPC remains tripped, and the TRIP signal remains present on the line 22, until the command signal on the line 15 is removed and again applied.

When an operator decides to energize a load, the power supply should be operating and providing power on the line 13. The operator then provides a command 24 to energize a load, e.g., reposition a switch, press a button, type a command on a computer, etc. Once the operator commands a load to be energized, a "COMMAND ON" signal is provided on a line 25 to a first AND gate 27 and a second AND gate 28. The other input to the first AND gate 27 is a signal on the line 13 indicative of the power supply being in operation and supplying current to the SSPC 11. The output of the AND gate 27 is provided on a line 30 to a start-up delay timer 33. When a signal is applied by the AND gate to the start-up delay timer 33 on the line 30, the output of the start-up delay timer on a line 35 does not change for a start-up delay period ($\tau_{SU}$). After the expiration of the start-up delay period, the start-up delay timer provides a signal on the line 35 corresponding to the signal on the line 30. The output of the start-up delay timer is provided on the line 35 to an inverting terminal of a third AND gate 37. As is well known in the art, the inverting terminal provides the AND gate with the inverse of the signal on the line 35.

The other inputs to the third AND gate 37 are the TRIP signal on the line 22, and the output of a reset delay timer 40 on a line 42 via an inverting terminal. The input to the reset delay timer 40 is the TRIP signal on the line 22. When the TRIP signal is applied to the reset delay timer 40 on the line 22, the output of the reset delay timer on line 42 does not change for a reset delay period ($\tau_R$). After the expiration of the reset delay period, the reset delay timer provides a signal on the line 42 corresponding to the TRIP signal on the line 22.

The output of the third AND gate 37 is provided on a line 45 to the second AND gate 28 via an inverting terminal. The output of the second AND gate is the COMMAND signal on the line 15.

The basic operations of the SSPC 11 will be described prior to describing the operation of the SSPC control logic 10. The SSPC has four operating conditions: OFF, ON, TRIPPED and RESET. If the power supply is not energized and no current is being supplied on the line 13, the SSPC is OFF. Additionally, if the power supply is operating and supplying a current on the line 13, but a COMMAND signal is not present on the line 15, the SSPC is OFF. When the COMMAND signal is applied on the line 15 with the power supply operating and supplying current on the line 13, the SSPC is ON and provides power to the load on the lines 20. If a trip condition occurs, i.e., the load current exceeds an over current set point or threshold, the SSPC is TRIPPED, the current supply to the load is interrupted, and the SSPC provides a TRIP signal on the line 22. The SSPC is RESET and the TRIP signal removed if the COMMAND signal is removed and then reapplied after the reset delay period $\tau_R$.

The operation of the SSPC control logic 10 is best understood by example. Assume the following initial conditions: the SSPC is OFF, the power supply is energized and supplying power on the line 13, the COMMAND ON signal is not present on the line 25 and the TRIP signal is not present on the line 22. Therefore, the output of the first AND gate 27 is logic low, e.g., zero, on the line 30 (because the COMMAND ON signal is zero on the line 25), and the output of the start-up delay timer 33 is zero on the line 35. Additionally, the TRIP signal on the line 22 is zero, and therefore the output of the reset delay timer 40 is zero on the line 42. The output of third AND gate 37 is zero on the line 45 (because the TRIP signal is zero on the line 22), and provides a logic high, e.g., one, to the second AND gate 28 via the inverting terminal. The output of the second AND gate, i.e., the COMMAND signal, is zero on the line 15 (because the COMMAND ON signal is zero on the line 25).

When the COMMAND ON signal is applied on the line 25, the second AND gate 28 provides a COMMAND signal on the line 15, and the SSPC is turned ON. Additionally, the output of the first AND gate 27 is a one on the line 30; however, the output of the start-up delay timer 33 remains a zero on the line 35 for the start-up delay period $\tau_{SU}$. If a trip occurs during the start-up delay period, the SSPC 11 trips and current is interrupted to the load 20. Additionally, a TRIP signal is provided on the line 22 to the third AND gate 37 and to the reset delay timer 40. The output of the reset delay timer remains zero on the line 42 for the reset delay period $\tau_R$, and the output of the third AND gate changes from zero to one. Therefore, the output of the second AND gate 28 is zero on the line 15, removing the COMMAND signal from the SSPC.

At the expiration of the reset delay period, the output of the reset delay timer 40 is a one on the line 42, and therefore the output of the third AND gate change is from a one to zero. The second AND gate 28 then provides a COMMAND signal on the line 15, and the SSPC is RESET on. It will therefore be understood that if the SSPC trips during the start-up delay period, it will automatically reset after the reset delay period. The length of the start-up delay period may be tailored to the starting time of a particular load, thereby providing multiple resets as necessary for unusually long starting transients. After the expiration of the start-up delay period, the output of the start-up delay timer 33 is a one on the line 35. Therefore, if the SSPC trips after the time for a normal starting transient has expired, the COMMAND ON signal must be removed and then reapplied to reset the SSPC.

The SSPC control logic 10 may be embodied in digital integrated circuitry which implements the system described hereinbefore. However, the control logic may also be of the type employing a known microprocessor (UPROC) for executing an algorithmic subroutine of FIG. 2, as described hereinafter, which implements automatic reset of an SSPC during load starting, and which provides fast trips of the SSPC after a start-up delay period.

Figure 2:
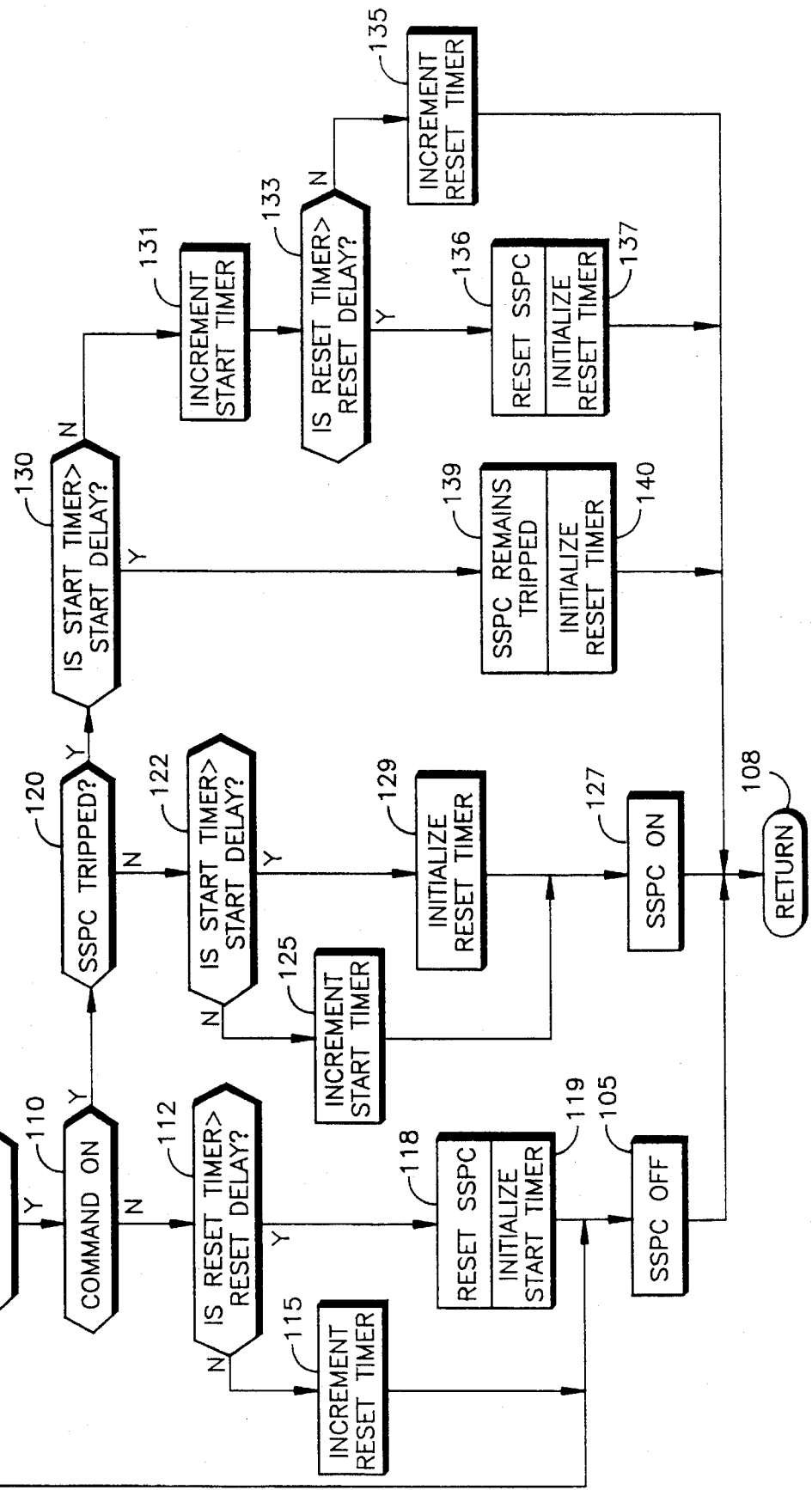
FIG. 2 is a simplified logic flow diagram of a routine for providing SSPC automatic reset during load starting in accordance with FIG. 1.

Referring to FIG. 2, the subroutine is entered in a step 100, and the UPROC checks if the power supply is operating and suppling current to the SSPC in a test 102. If the results of the test 102 are negative, step 105 is performed wherein the SSPC remains turned OFF, and the subroutine returns in a step 108. If the results of the test 102 are positive, the UPROC checks if the COMMAND ON signal is present in a test 110. If the SSPC is not commanded on, the results of the test 110 are negative and the UPROC checks if the reset delay timer is greater than the reset delay period in a test 112.

If the SSPC tripped, and the COMMAND signal has not been removed for a period greater than the reset delay period, the results of the test 112 are negative, and a step 115 is performed wherein the reset delay timer is incremented. Thereafter, the step 105 is performed wherein the SSPC remains turned OFF, and the subroutine returns in the step 108. If the COMMAND ON signal was removed for a period greater than the reset delay period, the results of the test 112 are positive, and the steps 118 and 119 are consecutively performed wherein the SSPC is RESET and the start-up delay timer is initialized. Thereafter, the step 105 is performed wherein the SSPC remains turned OFF, and the subroutine returns in the step 108.

When the power supply is operating and the SSPC is commanded on, the results of the test 110 are positive, and the subroutine reaches a test 120 wherein the UPROC checks if the TRIP signal is present and the SSPC is tripped. If the SSPC is ON, the results of the test 120 are negative, and the UPROC checks if the start-up delay timer is greater than the start-up delay period in a test 122. If the SSPC was just turned ON, the results of the test 122 will be negative, and the subroutine reaches a step 125 wherein the start-up delay timer is incremented. Next, the UPROC performs a step 127 wherein the SSPC remains turned ON. The subroutine then returns in the step 108. However, if the start-up delay timer is greater than the start-up delay period, the results of the test 122 are positive and a step 129 is performed wherein the reset delay timer is initialized. The UPROC then perform the step 127 wherein the SSPC remains turned ON, and the subroutine then returns in the step 108.

If the SSPC is tripped, the results of the test 120 are positive, and the UPROC checks if the start-up delay timer is greater than the start-up delay period in a step 130. If the results of the test 130 are negative, a step 131 is performed wherein the start-up delay timer is incremented. Next, the UPROC checks if the reset delay timer is greater than the reset delay period in a test 133. If the results of the test 133 are negative, a step 135 is performed wherein the reset delay timer is incremented. The subroutine then returns in the step 108. However, if the results of the test 133 are positive, steps 136 and 137 are consecutively performed wherein the SSPC is RESET on, and the reset delay timer is initialized. The subroutine then returns in the step 108. Therefore, if the SSPC trips during the start-up delay period, it remains tripped for a period equal to the reset delay period and then it is automatically reset on.

If the start-up delay period has expired, the results of the test 130 are negative, and steps 139 and 140 are consecutively performed wherein the SSPC remains in the TRIPPED condition and the reset delay timer is initialized. The subroutine then returns in the step 108. Therefore, if the SSPC trips after the expiration of the start-up delay period, it will remain tripped until the COMMAND ON signal is removed and restored (tests and steps 112 through 119).

The start-up delay period and the reset delay period are selected to provide the desired SSPC control logic characteristics; however, it will be understood by those skilled in the art the the start-up delay period will typically be longer than the reset delay period for providing the automatic reset control of the present invention.

Although the invention is shown as being a separate or add-on part to an existing SSPC, it may be provided as an integral part of the SSPC. In such case, the automatic reset during load starting of the present invention may be implemented with a computer program change to the program control of an SSPC which is implemented digitally by means of a computer. Alternatively, the invention could be implemented with a dedicated digital or analog hardware change to existing SSPC control logic, as necessary and applicable.

Although the invention has been illustrated and described with respect to exemplary embodiments thereof, it should be understood by those skilled in the art that the foregoing and various other changes, omissions and additions may be made therein and thereto, without departing from the spirit and scope of the present invention.

I claim:

1. A solid state power controller (SSPC) for controlling the application of a source voltage to at least one load, comprising:

control means for providing a COMMAND signal;

said SSPC being responsive to said COMMAND signal for applying said source voltage to said load, a load current being developed in response to the application of said source voltage to said load;

said SSPC providing a TRIP signal in response to an overload condition wherein said load current is in excess of a threshold value, said SSPC interrupting the application of said source voltage to said load in response to an overload condition; and said SSPC removing said TRIP signal, and reapplying said source voltage to said load in response to the removal and subsequent reapplication of said COMMAND signal;

characterized by:

command means for providing a COMMAND ON signal;

start-up delay means for establishing the commencement of a start-up delay period in response to the presence of said COMMAND ON signal; and said control means being responsive to the absence of said COMMAND ON signal for removing said COMMAND signal, responsive to the presence of said COMMAND ON signal for providing said COMMAND signal, and responsive to the presence of said trip signal only during said start-up delay period for automatically removing said COMMAND signal for a reset delay period and then automatically reapplying said COMMAND signal.

2. An SSPC according to claim 1 further comprising manually actuable operator interface means, said command means being responsive to the actuation of said operator interface means for providing said COMMAND ON signal.

3. An SSPC according to claim 1 wherein said control means further comprises reset delay means responsive to the presence of said TRIP signal for establishing the commencement of said reset delay period.

4. An SSPC according to claim 3 wherein the duration of said start-up delay period is longer than the duration of said reset delay period.

5. An SSPC according to claim 1 wherein said threshold value is selected to be less than the load current developed in reponse to a load starting transient during said start-up delay period.

6. A start-up reset control for a solid-state power controller (SSPC), the SSPC being responsive to the presence of a COMMAND signal for applying a source voltage to at least one load, thereby resulting in the development of a load current, the SSPC interrupting the application of the source voltage to the load in response to the absence of said COMMAND signal or in response to an overload defined as the load current exceeding a threshold value, the SSPC reapplying the source voltage to the load after the occurrence of an overload only after the removal and reapplication of the COMMAND signal, the start-up reset control comprising:
- command means for providing a COMMAND ON signal;
- start-up delay means for determining the commencement of a start-up delay period in response to the presence of said COMMAND ON signal; and
- control means responsive to the absence of said COMMAND ON signal for removing said COMMAND signal, responsive to the presence of said COMMAND ON signal for providing said COMMAND signal, and responsive to an overload condition only during said start-up delay period for automatically removing said COMMAND signal for a reset delay period and then automatically reapplying said COMMAND signal.

7. A start-up reset control for an SSPC according to claim 6 further comprising manually actuable operator interface means, said command means being responsive to the actuation of said operator interface means for providing said COMMAND ON signal.

8. A start-up reset control for an SSPC according to claim 6 wherein said control means further comprises reset delay means responsive to the occurrence of an overload for establishing the commencement of said reset delay period.

9. A start-up reset control for an SSPC according to claim 8 wherein the duration of said start-up delay period is longer than the duration of said reset delay period.

10. A start-up reset control for an SSPC according to claim 6 wherein said threshold value is selected to be less than the load current developed in reponse to a load starting transient during said start-up delay period.

11. A method for automatically resetting a solid state power controller (SSPC) in response to a high current condition caused by the starting of a load which draws a high starting current, the SSPC being responsive to the presence of a COMMAND signal for applying a source voltage to at least one load, thereby resulting in the development of a load current, the SSPC interrupting the application of the source voltage to the load in response to the absence of said COMMAND signal or in response to an overload defined as the load current exceeding a threshold value, the SSPC reapplying the source voltage to the load after the occurrence of an overload only after the removal and reapplication of the COMMAND signal, the method comprising the steps of:
- providing a COMMAND ON signal;
- establishing the commencement of a start-up delay period in response to the presence of said COMMAND ON signal;
- providing said COMMAND signal in response to the presence of said COMMAND ON signal; and
- automatically removing said COMMAND signal for a reset delay period and then automatically reapplying said COMMAND signal in response to an overload only during said start-up delay period.

12. The method of claim 11 further comprising the step of providing manually actuable operator interface means, said COMMAND ON signal being provided in response to the actuation of said operator interface means.

13. The method of claim 11 further comprising the step of establishing the commencement of said reset delay period in response to the occurrence of an overload.

14. The method of claim 13 wherein the duration of said start-up delay period is longer than the duration of said reset delay period.

15. The method of claim 11 further comprising the step of selecting said threshold value to be less than the load current developed in reponse to a load starting transient during said start-up delay period.

* * * * *